INVENTORS
FRANCOIS ANSELIN
JEAN CHENAIS
BY *Bacon & Thomas*
ATTORNEYS

Sept. 15, 1964  F. ANSELIN ETAL  3,149,228
X-RAY DIFFRACTION CHAMBER FOR THE STUDY OF A SINGLE CRYSTAL
LOCATED IN A POLYCRYSTALLINE SAMPLE
Filed Aug. 8, 1962  2 Sheets-Sheet 2

INVENTORS
FRANÇOIS ANSELIN
JEAN CHENAIS
BY Bacon & Thomas
ATTORNEYS

United States Patent Office 3,149,228
Patented Sept. 15, 1964

3,149,228
X-RAY DIFFRACTION CHAMBER FOR THE STUDY OF A SINGLE CRYSTAL LOCATED IN A POLY-CRYSTALLINE SAMPLE
Francois Anselin, Paris, and Jean Chenais, Boissy sous Saint Yon, France, assignors to Commissariat a l'Energie Atomique, Paris, France
Filed Aug. 8, 1962, Ser. No. 215,663
Claims priority, application France, Aug. 31, 1961, 872,081
10 Claims. (Cl. 250—51.5)

The present invention relates to an apparatus known as a "diffraction chamber" which is intended for the purpose of recording back-reflection patterns (Laue method) of a single crystal located in a polycrystalline sample and placed in the path of an incident X-ray beam.

The invention has for its object to produce a diffraction chamber which serves for the purpose of fixing a metallographic specimen, then locating with high precision both the crystal in the said metallographic specimen and the zone to be examined in the said crystal, then bringing the said zone in a virtually automatic manner into the recording position, that is to say in the incident X-ray beam, by means of a simple and rapid operation.

The invention is additionally directed to a diffraction chamber which provides a simple, rapid and accurate means for returning the sample from the recording position to the locating position, for displacing the sample for the purpose of locating another zone to be examined, and for returning the crystal to the examination position and also for replacing the crystal by another crystal, it being possible to carry out these various operations on crystals of small size, the minimum size of the crystal which can be studied separately being dependent only upon the size of focal spot of the X-ray tube and collimator which are employed with this apparatus.

The diffraction chamber in accordance with the invention is essentially characterized in that it comprises a sample-holder unit which is rotatably mounted about a transverse horizontal axis integral with a frame and on which the sample is mounted in such manner that the plane $\pi$ of examination of said sample contains said axis, means for producing the pivotal movement of the sample-holder unit above the transverse horizontal axis of this latter, a removable member materializing a vertical axis located in the plane of the said horizontal axis, means for causing an X-ray beam to coincide with the point of intersection of said axes, an optical apparatus which is adjustable with respect to the frame in such manner that the optical axis thereof is brought into coincidence with said vertical axis, and means for adjusting the sample-holder unit so as to bring a chosen point of the plane $\pi$ of the sample in the vertical axis which is defined by the positionally-adjusted optical axis of the apparatus, thereby making it possible, when the plane $\pi$ is in the horizontal position, to bring the point chosen in the axis of the optical apparatus into coincidence with the said point of intersection of said horizontal axis and said vertical axis, then after producing a pivotal movement of said sample-holder unit through an angle of 90° about the transverse horizontal axis thereof to bring said plane $\pi$ into a vertical position in front o fthe X-ray beam, the point chosen remaining in coincidence with the said point of intersection.

Further characteristic features and advantages of the invention will be brought out by the description which follows below.

Figure 1:
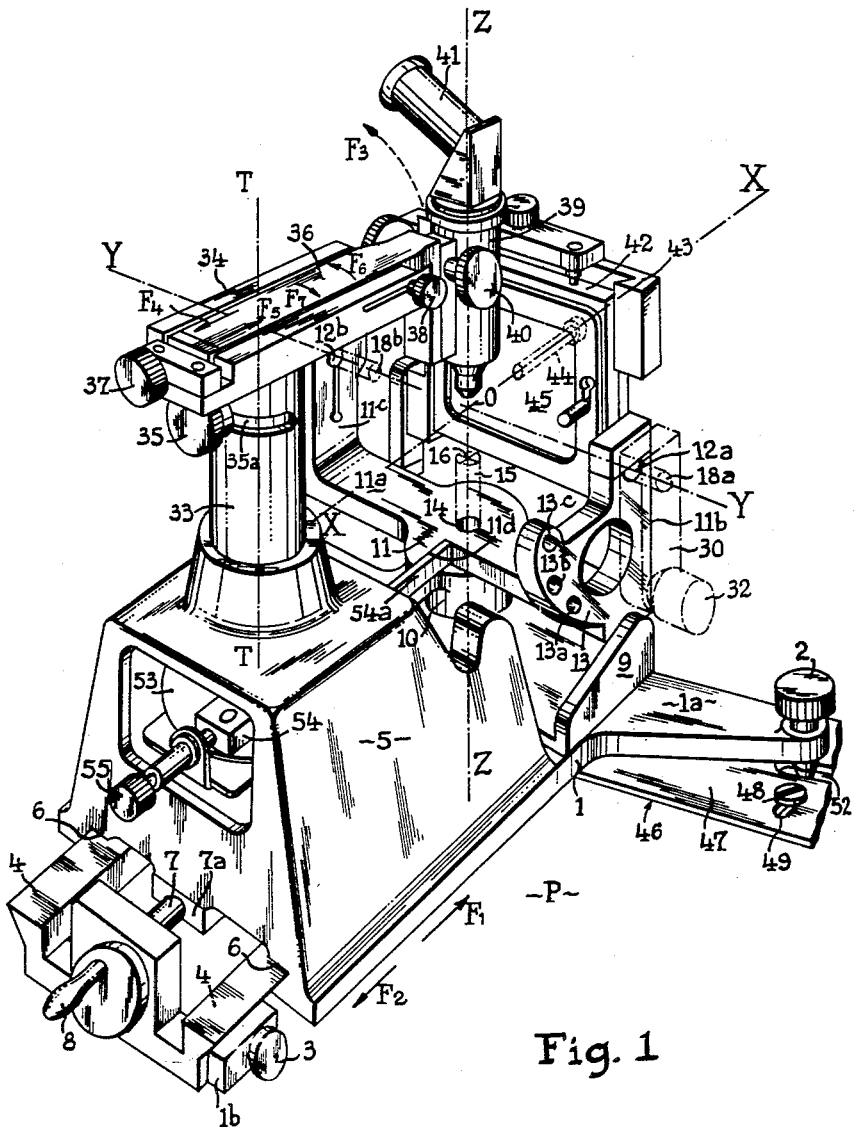
FIG. 1 is a view taken in perspective of one example of construction of the diffraction chamber looking from the rear, the sample-holder unit being represented only by its spindles for the sake of clarity of the drawing.
Figure 2:
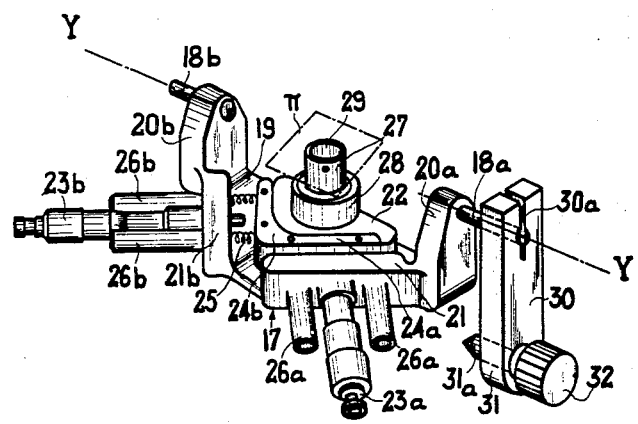
FIG. 2 is a view taken in perspective of the sample-holder unit.
Figure 3:
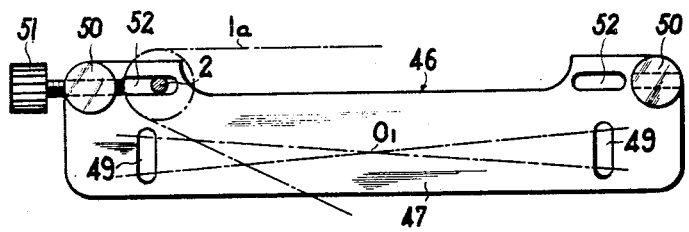
FIG. 3 is a top view of an accessory of the diffraction chamber.

The apparatus or "diffraction chamber" in accordance with the present invention as illustrated in FIGS. 1 to 3 comprises a solid mounting-plate 1 which rests at three points on the work plane P which can be constituted, for example, by the table of a micro-focus X-ray generator which is located at the rear of the apparatus seen in accordance with FIG. 1 but which has not been shown in the drawings.

The three bearing points are constituted on the one hand at the rear end by the cone-points of two set-screws 2 (only one of which can be seen in the drawing) which are screwed in two lateral arms 1a which are formed solid with the mounting-plate and located at the rear of this latter, symmetrically with respect to the vertical mid-plane and, on the other hand at the front end, by a cam which is rotatably mounted in the front portion 1b of the mounting-plate and operated by means of a knob 3 so as to lift or lower the said front portion of the mounting-plate.

By means of these three adjustment elements, the mounting-plate can be brought at least approximately to the horizontal position; this is the meaning which will be understood, for the sake of convenience of explanation, when the terms "horizontal" or "vertical" are employed below with reference to those elements which are integral with the mounting-plate.

The mounting-plate 1 is provided with slideways 4 on which is adapted to slide a frame 5 constituted by a casing which is cast in one piece and in which are formed sliding bearing surfaces 6, the longitudinal movements of translation of the frame in the directions $F_1$ and $F_2$ with respect to the mounting-plate being controlled by means of a screw 7 which rotates inside the mounting-plate and is screwed in a nut 7a which is integral with the frame, said screw being fitted with a crank-handle 8. The forward longitudinal movement of said frame is limited by a stop member which ensures that the frame is rigidly locked in a position which, as will be brought out in the description which follows, corresponds to a suitable distance of the crystal with respect to the radiographic recording film.

The frame 5 is provided near the front portion thereof with a boss 10 which is intended for the purpose of centering a vertical conical pin (which has not been shown in drawing) on which is mounted a rigid and solid U-shaped spindle-bearing cradle 11 provided with a horizontal arm 11a which is adapted to pivot about the said conical pin, the geometrical axis of which is indicated by the line Z—Z in FIG. 1, and with two vertical arms 11b and 11c respectively carrying two bearings 12a, 12b which are lined-up along a same horizontal axis Y—Y which determines with the axis Z—Z a horizontal plane in which is located the origin O or point of intersection of the said axes which is stationary with respect to the frame.

It will first be assumed in the following description that the craddle 11 is immobilized on the frame in the position shown in the drawing, the Y—Y, Z—Z plane being accordingly a transverse vertical plane which is well determined with respect to the frame.

The arm 11b has the shape of an end-plate comprising a sector 13 which is cast in one piece with the said arm and in which are formed orifices 13a, 13b, 13c ... which are disposed over the arc of a circle, the center of which is located in the axis Y—Y.

The conical centering pin has a concentric bore 14 for the purpose of fitting and centering therein a removable graticule-holder pin 15 constituted by a metallic shaft-length which is illustrated in chain-dotted lines in FIG. 1, while the top flat face of the said pin 15 materializes the vertical geometrical axis Z—Z.

Provision is made for mounting on the cradle 11 a sample-holder unit 17 as illustrated in FIG. 2 which is provided with spindles 18a, 18b, these latter being shown in FIG. 1 in chain-dotted lines inside the bearings 12a and 12b in the position of use, the remainder of the sample-holder as shown in FIG. 1 having been broken away in order that the central portion of the apparatus can be clearly seen.

The sample-holder unit 17 comprises (as shown in FIG. 2) a main plate 19 which, in the position which has been illustrated, can be considered as the "bottom" plate and which is cast in one piece with two arms 20a, 20b, the said arms being fitted with spindles 18a, 18b and carrying the unit which can accordingly swing about the comma axis Y—Y of said spindles. In addition, the said plate has two walls 21a, 21b which project from the said plate and which are at right angles to the plane of the plate and at right angles to each other. The unit which is formed by the plate, the arms, the walls and the spindles constitutes a solid one-piece component which is practically undeformable.

The main plate 19 carries a triangular ancillary plate (or "top" plate) 22 which is adapted to slide in a movement of translation parallel to the two orthogonal directions as materialized by the walls 21a and 21b, the said movements of translation being controlled by means of two micrometric stops 23a, 23b which are carried by the walls 21a, 21b and which are applied against two bosses 24a, 24b of the top plate. The said top plate is acted upon by two pairs of springs such as the spring 25 which are housed in pairs of tubes 26a, 26b, these latter being closed at one end and fixed on the walls 21a, 21b through which they pass.

There is mounted on the top face of the plate 22 a sample-holder 27 fitted with a nut 28 which locks the sample in position in such manner that the plane of the front face 29 of the sample which has been subjected to the preparation treatment is permanently set in position in the axis Y—Y.

The free end of the spindle 18a projects from the outer face of the end-plate 11b and an arm 30 which is illustrated in full lines in FIG. 2 and in chain-dotted lines in FIG. 1 can be fixed on said free end after mounting the sample-holder unit 17 in position, this fixation being carried out by means of a screw or any like means, or simply by the elastic clamping of said arm 30, which is split at 30a, on the said spindle. A cone-point pin 31a is fitted at the end of said arm 30 and is integral with a knob 32 by means of which the said pin can be pulled back in opposition to a spring (not shown in the drawings) which draws back the said cone-point pin towards the end-plate 11b in such manner that, as it penetrates inside any one of the orifices 13a, 13b, 13c the said pin locks the sample-holder unit in a position corresponding to any one of a number of possible angles of inclination from 0 to 90° with respect to the horizontal.

On the frame 5 is fixed a vertical supporting bracket which comprises a fixed vertical column 33 and a horizontal arm 34 which is adapted to pivot in a horizontal plane about the axis T—T of the column 33 and which can be locked in position by means of a knob 35 passed through an arcuate groove 35a which limits the pivotal movement of the said arm 34 both outwardly and inwardly. A plate 36 is adapted to slide longitudinally inside said arm 34 in the direction $F_4$, $F_5$ and transversely in the direction $F_6$, $F_7$, while these two movements of translation can be controlled by means of knobs 37 and 38 respectively. The free end of the plate 36 carries an optical locating apparatus which is constituted by a microscope 39 having a strictly vertical axis (that is to say parallel to the line Z—Z) and which is fitted with a focussing knob 40, an eyepiece tube 41, and an internal graticule. A carriage 42 is adapted to slide vertically in a support 43 which is inturn adapted to slide horizontally with respect to the frame. The said carriage carries an X-ray collimator tube 44 and a film-holder 45 in which the film is firmly held by means of a device which ensures continuous stability of the film throughout the test.

An ancillary member 46 or so-called "fork" as illustrated in FIG. 3 and partially visible in FIG. 1 is constituted by a plate 47 which is fixed on the work plane P by means of two screws 48 which pass through elongated slots 49, there being formed on the said plate bosses 50 providing passages for screws 51 which are applied against the ends of the arms 1a, 1b, the screws 2 of which pass inside elongated slots 52. The said fork permits the orientation of the plate 1 with respect to the X-ray tube by means of the pivotal movement of the fork about the central point $O_1$.

In order to produce a Laue pattern the apparatus as described provides the possibility of locating to within 0.005 mm. the crystal to be studied in a metallographic specimen and then bringing the said crystal in the incident X-ray beam by effecting a rotation through an angle of 90°.

To this end, the following operations are carried out successively:

The sample-holder unit being in the vertical position, the removable graticule-carrier unit 15 which materializes the axis Z—Z is placed in position.

The graticule of the microscope is brought into coincidence with the graticule 16 by causing the microscope to pivot about the axis T—T and by producing action on the two knobs 37, 38 which control the two orthogonal movements of translation of the microscope, and of course by focussing the apparatus by means of the knob 40.

When this coincidence is obtained, the unit 15 can be removed since the optical axis of the microscope is then in coincidence with the geometrical axis Z—Z.

The sample-holder is caused to pivot about the axis Y—Y of its spindles so as to bring the sample-holder into the horizontal position.

The sample is set in position and mounted in the sample-holder, the plane π then containing the axis Y—Y.

The zone to be studied is then chosen by means of the micrometric screws 23a, 23b, and the centre of the said zone is brought into coincidence with the graticule of the microscope, that is to say in the axis Z—Z. The point chosen then coincides with the origin O or point of intersection of the axes Y—Y and Z—Z. The plane π coincides with the plane XOY, X—X being the line which passes through O at right angles to the plane YOZ.

The microscope is then withdrawn on one side of the apparatus by being made to pivot about the axis T—T of the column.

When the apparatus has been previously adjusted so that the axis of the X-ray beam passes through the point O, a rotation through an angle of 90° of the sample-holder unit about the axis Y—Y brings the plane π into coincidence with the plane YOZ.

The sample is then in position for recording the diffraction pattern which can be effected in accordance with known techniques.

If the sample-holder and the microscope are then brought back into their locating positions, a displacement of the sample by means of the micrometric screws 23a, 23b will make it possible to locate a new point of surface which is accordingly brought into the recording position by means of a simple tilting movement of the sample-holder unit.

This apparatus accordingly permits of simple, rapid and accurate manipulations with a view to obtaining von Laue patterns.

In the case of other applications, it can prove necessary to cause the sample to pivot about the axis Z—Z.

The apparatus is preferably fitted with a device which provides for this possibility. The cradle is then considered as being movable about its vertical axis. To this end, a low-speed motor (not illustrated in the drawings) which is enclosed in the frame, drives a cam 53 which causes a link-rod 54 to oscillate horizontally, the extremity 54a of the said link-rod being applied against the edge 11d of a slot formed in the pivotal arm 11a. The eccentricity of the cam 53 and consequently the rate of oscillation of the link-rod 54 is adjusted by means of a screw 55 (as shown in FIG. 1) which is integral with the cam 53 and which is adapted to move along a diameter of the cam and thus to serve as a point of application for the link-rod 54. A micrometric screw keys the oscillating unit in a position at right angles to the axis X—X.

The invention is not limited to the form of embodiment which has been described and illustrated and which has been chosen solely by way of non-limitative example.

What we claim is:

1. X-ray diffraction chamber for the study of a single crystal located in a polycrystalline sample, characterized in that said X-ray diffraction chamber comprises a sample-holder unit which is rotatably mounted about a transverse horizontal axis integral with a frame and on which the sample is mounted in such manner that the plane $\pi$ of examination of said sample contains said axis, means for producing the pivotal movement of the sample-holder unit about the transverse horizontal axis thereof, a removable member materializing a vertical axis located in the plane of said horizontal axis, means for causing an X-ray beam to coincide with the point of intersection of said axes, an optical apparatus which is adjustable with respect to the frame in such manner that the optical axis thereof is brought into coincidence with said vertical axis, and means for adjusting the sample holder unit so as to bring a chosen point of the plane $\pi$ of the sample in the vertical axis defined by the positionally-adjusted optical axis of the apparatus, thereby making it possible when the plane $\pi$ is in the horizontal position to bring the point chosen in the axis of the optical apparatus in coincidence with said point of intersection of said horizontal axis and said vertical axis, then after producing a pivotal movement of said sample-holder unit through an angle of 90° about the transverse horizontal axis thereof to bring the plane $\pi$ into the vertical position in front of the X-ray beam, the point chosen remaining in coincidence with said point of intersection.

2. Diffraction chamber in accordance with claim 1, characterized in that the removable member which materializes the vertical axis is constituted by a shaft-length which co-operates with a bore formed in the frame and the flat horizontal top face of which is provided with a graticule.

3. Diffraction chamber in accordance with claim 1, characterized in that the optical apparatus is a vertical-axis microscope which is provided with a graticule in the optical axis thereof.

4. Diffraction chamber in accordance with claim 3, characterized in that the microscope is mounted on a vertical supporting bracket adapted to pivot on the frame about the vertical column thereof and provided with devices for effecting the horizontal movement of translation of the microscope in two directions at right angles to each other, thereby permitting the optical axis of the microscope to be brought in coincidence with the vertical axis of the removable element.

5. Diffraction chamber in accordance with claim 1, characterized in that the sample-holder unit comprises a main plate fitted with two spindles along an axis which passes through the plane $\pi$, said spindles being rotatably mounted in two bearings carried by a cradle which is integral with the frame, the axis of said bearings forming the transverse horizontal axis.

6. Diffraction chamber in accordance with claim 5, characterized in that the main plate carries an ancillary plate adapted to move in translation over the main plate in directions at right angles to each other by means of micrometric screws, said ancillary plate being provided with a sample-holder such that the plane $\pi$ of the sample-holder contains the geometrical axis of the spindles.

7. Diffraction chamber in accordance with claim 1, characterized in that the frame is mounted to slide longitudinally on a supporting plate provided with means for effecting said longitudinal movement and a front stop for determining the front end position of the crystal with respect to the focal spot of the X-ray source.

8. Diffraction chamber in accordance with claim 7, characterized in that the supporting plate comprises three bearing members which can be adjusted for height and a bearing plate by means of which the supporting plate can be caused to pivot about an axis which is vertical with respect to the work plane supporting the apparatus.

9. Diffraction chamber in accordance with claim 1, characterized in that it comprises a chassis which carries a film-holder and an X-ray collimator tube, the chassis being adjustable by means of a movement of translation in a transverse horizontal direction and in a vertical direction.

10. Diffraction chamber in accordance with claim 1, characterized in that it comprises a device which is driven by an electric motor so as to cause the cradle carrying the sample-holder unit to pivot about the vertical axis thereof.

References Cited in the file of this patent

UNITED STATES PATENTS

| 2,417,657 | McLachlan | Mar. 18, 1947 |
| 2,615,136 | Evans | Oct. 21, 1952 |
| 2,904,688 | Miller | Sept. 15, 1959 |

FOREIGN PATENTS

| 870,555 | Great Britain | June 14, 1961 |